(12) United States Patent
Treves et al.

(10) Patent No.: US 9,729,680 B2
(45) Date of Patent: Aug. 8, 2017

(54) METHODS AND SYSTEMS TO EMBED VALID-FIELD (VF) BITS IN CLASSIFICATION KEYS FOR NETWORK PACKET FRAMES

(71) Applicant: Freescale Semiconductor, Inc., Austin, TX (US)

(72) Inventors: Ron Treves, Kfar Saba (IL); Evgeni Ginzburg, Petah Tikva (IL); Adi Katz, Ramat Gan (IL)

(73) Assignee: NXP USA, Inc., Austin, TX (US)

( * ) Notice: Subject to any disclaimer, the term of this patent is extended or adjusted under 35 U.S.C. 154(b) by 174 days.

(21) Appl. No.: 14/694,091

(22) Filed: Apr. 23, 2015

(65) Prior Publication Data

US 2016/0316044 A1  Oct. 27, 2016

(51) Int. Cl.
*H04L 29/06* (2006.01)
*H04L 12/851* (2013.01)

(52) U.S. Cl.
CPC .......... *H04L 69/22* (2013.01); *H04L 47/2441* (2013.01)

(58) Field of Classification Search
CPC ............................ H04L 69/22; H04L 47/2441
See application file for complete search history.

(56) References Cited

U.S. PATENT DOCUMENTS

| | | | |
|---|---|---|---|
| 5,748,905 A | 5/1998 | Hauser et al. | |
| 6,768,738 B1 | 7/2004 | Yazaki et al. | |
| 7,760,719 B2 | 7/2010 | Yik et al. | |
| 8,009,673 B2 | 8/2011 | Gandal et al. | |
| 2004/0044868 A1* | 3/2004 | Guerrero | H04L 45/7457 711/164 |
| 2011/0264822 A1* | 10/2011 | Ferguson | H04L 45/00 709/235 |
| 2013/0163426 A1* | 6/2013 | Beliveau | H04L 67/327 370/235 |
| 2014/0153571 A1* | 6/2014 | Neugebauer | H04L 45/7457 370/392 |
| 2014/0219283 A1* | 8/2014 | Park | H04L 49/25 370/392 |
| 2016/0094460 A1* | 3/2016 | Shelar | H04L 45/56 370/392 |
| 2016/0248667 A1* | 8/2016 | Viens | H04L 45/66 |

* cited by examiner

*Primary Examiner* — Paul H Masur

(57) ABSTRACT

Methods and systems are disclosed to embed valid-field (VF) bits into classification keys for network packet frames. The embedded VF bits allow for extracted data from existing fields associated with frame data to be distinguished from default data used for missing fields where this extracted data and default data has been included within a frame classification key generated for a network packet frame. In certain embodiments, a valid-field field extraction command (VF-FEC) causes a key generator to embed VF bits into a frame classification key, and the logic state of the VF bits are used to distinguish extracted data from default data. Further, the disclosed embodiments allow VF bits to be selectively cleared based upon a bit mask applied prior to embedding of the VF bits. Still further, users can define VF-FECs and other field extraction commands (FECs) for key generation through one or more programmable key composition rules.

20 Claims, 4 Drawing Sheets

METHODS AND SYSTEMS TO EMBED VALID-FIELD (VF) BITS IN CLASSIFICATION KEYS FOR NETWORK PACKET FRAMES

TECHNICAL FIELD

This technical field relates to processing of network packet communications and, more particularly, to generation of frame classification keys for network packets.

BACKGROUND

It is often desirable for network connected systems to classify packets within network communications for later processing. Packet classification can use data extracted from data fields associated with the network packets to generate frame classification keys that can be used for later processing associated with the packets. Some packets, however, do not contain certain fields identified for use in data extraction for key generation. As such, default values are often written into the frame classification key for these missing fields when the frame classification key is generated for the packet. After frame classification keys are generated, however, it can be desirable to distinguish between actual data values extracted from the fields associated with the packet data and default data values that were used for missing fields. This task of distinguishing between actual extracted data and default data becomes particularly difficult when identical values can exist for both the extracted data and the default data (e.g., extracted data value can be all logic zeroes and the default value is all logic zeroes).

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Methods and systems are disclosed to embed valid-field (VF) bits into classification keys for network packet frames. The disclosed embodiments allow extracted data from existing fields associated with frame data to be distinguished from default data used for missing fields where this extracted data and default data has been included within frame classification keys generated for network packet frames. In certain embodiments, a valid-field field extraction command (VF-FEC) within a key composition rule causes a key generator to embed valid-field (VF) bits into a frame classification key generated for a received packet frame. The logic state of the VF bits can be used in part to distinguish extracted data from default data by indicating the validity of each of the fields identified for data extraction with respect to the generation of the frame classification key. The logic state of the VF bits can also be based upon the result of a logic condition or function applied to the frame data, such as a logic condition or function applied to a combination of metadata bits relating to a protocol for the packet frame. Extracted data is provided with respect to valid/existing fields, and default data is provided with respect to invalid/missing fields. Further, the disclosed embodiments allow for these VF bits to be selectively cleared based upon a bit mask prior to being embedded within a frame classification key, and data from a common field within the frame data can potentially be used more than once within a frame classification key. Still further, the disclosed embodiments allow users to alternate among embedding all of the VF bits in a frame classification key, embedding the VF bits in the frame classification key while selectively clearing bits by applying a bit mask, or not embedding any of the VF bits in the frame classification key. A variety of different features and variations can also be implemented.

Figure 1:
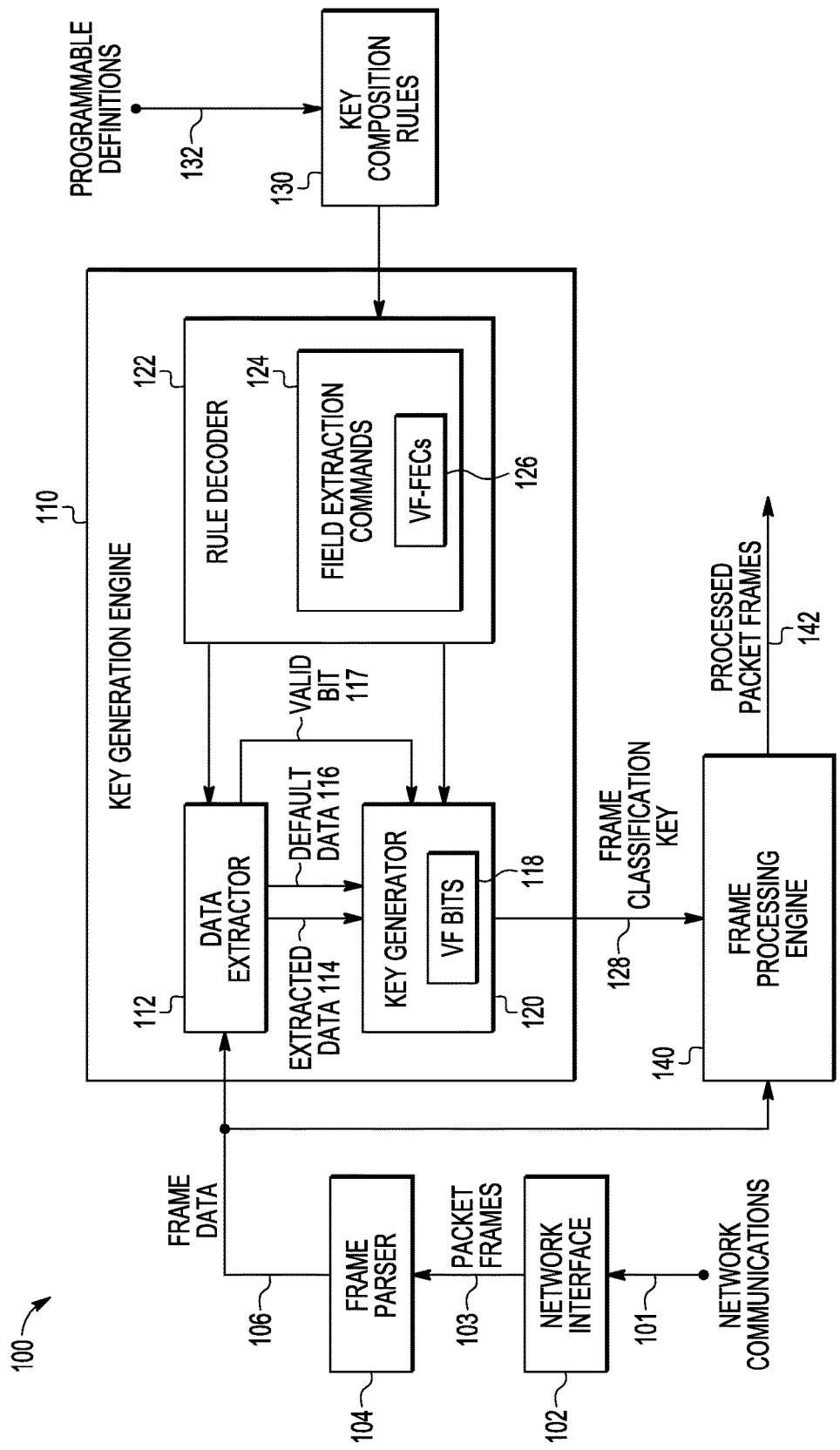
FIG. 1 is a block diagram of an example embodiment for generation of frame classification keys for network packet frames where valid-field (VF) bits that distinguish between extracted data and default data are embedded into the frame classification keys based upon valid-field field extraction commands (VF-FECs).

FIG. 1 is a block diagram of an example embodiment 100 for generation of frame classification keys 128 for input packet frames 103 from network communications 101 where valid-field (VF) bits 118 are embedded into the frame classification keys 128 based upon valid-field field extraction commands (VF-FECs) 126 which are part of a sequence of field extraction commands (FECs) 124 defined within a key composition rule 130. Network packet communications 101 are received by a network communication interface 102, and the input packet frames 103 from the network interface 102 are provided to frame parser 104. The frame parser 104 parses the contents of each of the input frames 103 to identify packet fields and/or metadata associated with the packet. After parsing the packet, the frame parser 104 forwards the resulting fields and metadata information fields as frame data 106 to key generation engine 110. It is noted that the metadata can include a variety of information related to the input frames 103 such as, for example, pointers to frame header fields, port numbers, traffic classes, and/or other information related to the packets.

The key generation engine 110 generates a frame classification key 128 for each of the input packet frames 103 based in part upon data extracted from fields for the frame data 106. The key generation engine 110 includes a rule decoder 122, a data extractor 112, and a key generator 120. The data extracted by data extractor 112 from fields for the frame data 106 is based upon field extract commands (FECs) 124 that can include one or more valid-field field extraction commands (VF-FECs) 126. These FECs 124 are defined within one or more key composition rules 130, and the key composition rules 130 are decoded by the rule decoder 122. The FECs 124 that are not VF-FECs 126 specify fields of the frame data 106 from which data bits are to be extracted for generation of the frame classification key 128 by the key generator 120. As described further below, a valid bit 117 is generated for each such FEC 124 to represent whether extracted data 114 or default data 116 is used for the frame classification key 128, and the valid bits 117 are stored as VF bits 118. The VF-FEC 126 is a specific type of FEC 124 that can be included anywhere in a sequence of FECs 124 of a key composition rule 130 and that will cause the currently stored VF bits 118 to be embedded into the frame classification key 128. The rule decoder 122 decodes one or more key composition rules 130 to generate a sequence of FECs 124 along with any VF-FECs 126 that have been defined and included within this sequence of FECs 124. The key composition rules 130 can be defined by users through user programmable definitions 132.

As one example, the VF bits 118 can be used to track the valid bits 117 for up to eight FECs 124 that were executed as specified in a key composition rule 103 just prior in sequence to the occurrence of an VF-FEC 126. Multiple VF-FECs 126 can also be defined within a key composition rule 130, and every VF-FEC 126 will cause the eight (8) most recent VF bits 118 pertaining to the eight (8) most recent FECs 124 to be embedded within the frame classification key 128. If fewer than eight FECs 124 have occurred before the VF-FEC 126, then default values (e.g., zero logic values) are included within the remaining bits for the VF bits 118. In addition, although this example and FIG. 2 below use eight (8) bits for VF bits 118, different numbers of bits can be tracked for the VF bits 118, as desired. As described further below, a mask can also be applied, if desired, to the VF bits 118 prior to their being embedded within the frame classification key 128. Upon executing a VF-FEC 126, the VF bits 118 can be reset or cleared so that if another VF-FEC 126 follows afterwards, this new VF-FEC 126 will only embed the valid bits 117 that were generated for FECs 124 that appear in the sequence of FECs 124 for the key composition rule 130 after the most recent VF-FEC 126.

During operation, for fields that exist in the frame data 106, data is extracted from these fields and the extracted data 114 is provided to the key generator 120. However, for fields that do not exist in the frame data 106, default data 116 is instead obtained and provided to the key generator 120. A valid bit 117 is generated for the extracted field specified by each FEC 124 that is executed and that is not a VF-FEC 126, and each valid bit 117 has one logic state if the field existed or fulfilled a defined logic condition or function applied to the frame data 106 and the opposite logic state if the field did not exist or did not fulfill a defined logic condition or function applied to the frame data 106. As such, the valid bit 117 indicates whether extracted data 114 or default data 116 was provided with respect to each of the extracted fields for key generation. The valid bits 117 are then used to generate the VF bits 118. The VF bits 118 can be stored, for example, within a data register or other data storage medium such as first-in-first-out (FIFO) buffer. As described further below, a pre-determined number of VF bits 118 can be kept such that the last X number of valid bits 117 (e.g., 8 bits) are stored as VF bits 118. If there are no VF-FECs 126 within the sequence of FECs 124 that are used to generate a frame classification key 128, then the VF bits 118 are not embedded with the frame classification key 128. However, if one or more VF-FECs 126 are included within the key composition rule 130, then VF bits 118 are embedded within the frame classification key 128 upon occurrence of each of the VF-FECs 126. As described below, the VF bits 118 can also be cleared once a VF-FEC 126 has been executed, and each new valid bit 117 is then used to re-populate and update the VF bits 118. Further, if a mask is also included within the VF-FEC 126 as described in more detail below, then the mask is used to selectively clear certain VF bits 118 before they are embedded within the frame classification key 128.

The resulting frame classification key 128 includes extracted data 114 for existing fields and any default data 116 included for non-existing fields based upon the sequence of FECs 124 as well as any VF bits 118 embedded based upon one or more VF-FECs 126 included within the sequence of FECs 124. The frame classification key 128 is output by the key generation engine 110 to the frame processing engine 140. In part, the frame processing engine 140 can perform table lookups to compare the frame classification key 128 to data within classification tables to determine a classification for each of the input packet frames 103. This classification can then be used in further processing of the input packet frames 103. For example, a packet classification can include, for example, an indication that the packet frame represents a data frame, an audio/video frame, a high priority frame, a low priority frame, and/or any other frame classification type. If embedded within the frame classification key 128, the VF bits 118 can be used by the frame processing engine 140 to determine whether data within the frame classification key 128 represents extracted data 114 or default data 116. For example, the VF bits 118 can be used to distinguish extracted data 114 (e.g., all zeroes) from default data 116 having the same data values (e.g., all zeroes). As a further example, the frame processing engine 140 can be configured to use the VF bits 118 to ignore default data 116 with the frame classification key 128 for frame classification purposes. The frame processing engine 140 could also use the VF bits 118 embedded within the frame classification key 128 for other purposes, as desired. Processed packet frames 142 can then be output by the frame processing engine 140 for additional processing and/or routing, as desired.

The VF-FECs 126 provide significant versatility in allowing a user to control whether or not to embed VF bits 118 for individual fields identified for key generation. Users can define key composition rules 130 that are decoded by rule decoder 122 into the FECs 124, and these key composition rules 130 can include one or more VF-FECs 126 or no VF-FECs 126, as desired, within the sequence of FECs 124. Each valid bit 117 is determined when data extraction is attempted for the particular field associated with an FEC 124 that is not a VF-FEC 126. If the field exists and data is extracted, the extracted data 114 is used for key generation, and the valid bit 117 is set to one logic state. If the field does not exist and/or data cannot be extracted, default data 116 is used key generation, and the valid bit 117 is set to a different logic state. For example, a valid bit 117 of logic one can represent extracted data, and a valid bit 117 of logic zero can represent default data. Alternatively, a valid bit 117 of logic zero can represent extracted data, and a valid bit 117 of logic one can represent default data. As one further example, a VF-FEC 126 can be formed to include the following components: (1) bits representing a code for a VF-FEC 126, and (2) bits representing a mask (if any) to be applied to the VF bits to be embedded. With respect to this last mask component, if mask bits are included, then only the non-masked bits of the VF bits are embedded while the masked bits are cleared and replaced with default bit values (e.g., logic zero). If no mask bits are included, then all of the VF bits 118 are embedded. Other variations could also be implemented while still taking advantage of embodiments that embed VF bits 118 within a frame classification key 129 as described herein.

It is noted that the key generation engine 110, as well as the frame parser 104 and the frame processing engine 140, can be implemented using one or more processing devices including controllers, microcontrollers, processors, microprocessors, hardware accelerators, configurable logic devices (e.g., field programmable gate arrays), and/or other processing devices. Further, the one or more processing devices can execute instructions stored in a non-transitory tangible computer-readable medium to perform the functions described herein. It is further noted the VF bits 118 and the composition rules 130 can be stored in any desired non-transitory tangible computer-readable medium. Such computer-readable mediums can include, for example, data storage devices, FLASH memory, random access memory, read only memory, programmable memory devices, reprogrammable storage devices, hard drives, floppy disks, DVDs, CD-ROMs, and/or any other non-transitory data storage mediums. Other variations could also be implemented.

Figure 2:
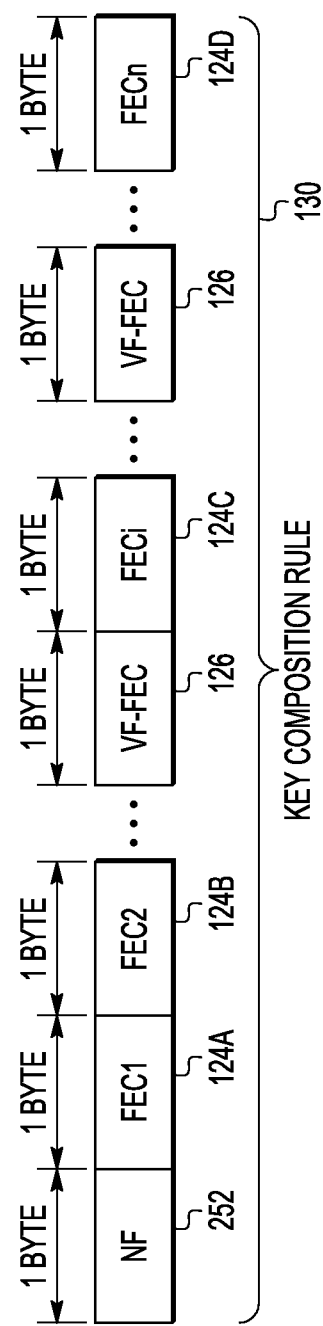
FIG. 2 is a diagram of an example embodiment for a key composition rule having a sequence of different field extraction commands (FECs) where one of the FECs is a valid-field field extraction command (VF-FEC) that appears in the sequence more than once and where the sequence is preceded with a value (NF) defining the number of FECs appearing in the key composition rule.

FIG. 2 is a diagram of an example embodiment for a key composition rule 130 having a sequence of different FECs 124 where one of the FECs is a VF-FEC 126 that appears in the sequence more than once and where the sequence is preceded with a value (NF) 252 defining the number of FECs appearing in the key composition rule. For the example embodiment depicted, it is assumed that there is a sequence of "n" different FECs 124A, 124B . . . 124C . . . 124D within the key composition rule 130 along with two VF-FECs 126. The FECs 124A, 124B . . . 124C . . . 124D that are not VF-FECs 126 can be different extraction command types, for example, different extraction commands types pertaining to different fields of protocol headers. As described above, the VF-FECs 126 represent a unique command dedicated to extracting and inserting VF bits 118 into the frame classification key 128. As indicated above, it is also assumed that the key composition rule 130 includes a data field (NF) 252 that represents the total number of FECs 124 including the VF-FECs 126 within the key composition rule 130. As one example, each of the data field 252, the FECs 124A, 124B . . . 124C . . . 124D, and the VF-FECs 126 can each be one byte (e.g., 8 bits) of data, and the total amount of bytes allowed within the key composition rule 130 can be limited to 64 bytes of data. Other variations can be implemented.

Looking back to FIG. 2, each of the FECs 124A, 124B . . . 124C . . . 124D identify data to be extracted from a field within the frame data 106. FECs (FEC1, FEC2) 124A/124B along with other FECs can occur in sequence before the first VF-FEC 126. Each of these FECs will have a valid bit 117 that will be stored as part of the VF bits 118. For this embodiment, it is assumed that the number of VF bits 118 is again limited to eight (8) bits, although different numbers of bits could also be stored. The first VF-FEC 126 will cause the VF bits 118 that represent the valid bits 117 for up to the eight (8) most recent FECs to be embedded with the frame classification key 128. For the example depicted, it is assumed that execution order is from left to right such that the most recent FECs are assumed to be those closest to each VF-FEC 126 from the left side. After execution of the first VF-FEC 126, it is assumed that the VF bits 118 are then cleared. The next FEC (FEC1) 124C represents the next FEC to be included within the key composition rule 130, and its valid bit 117 is stored as the first new bit within the cleared VF bits 118. The second VF-FEC 126 will again cause the VF bits 118 that represent the valid bits for up to the eight (8) most recent FECs the to be embedded with the frame classification key 128. The VF bits 118 are then again cleared. The VF bits 118 are still updated for each subsequent FEC until the last FEC (FECn) 124D is reached, even though no further VF-FEC 126 is included within the example embodiment depicted. The resulting frame classification key 128, therefore, will have extracted/default data bits for each of the FECs 124A, 124B . . . 124C . . . 124D along with the VF bits 118 embedded by the two VF-FECs 126.

Figure 3:
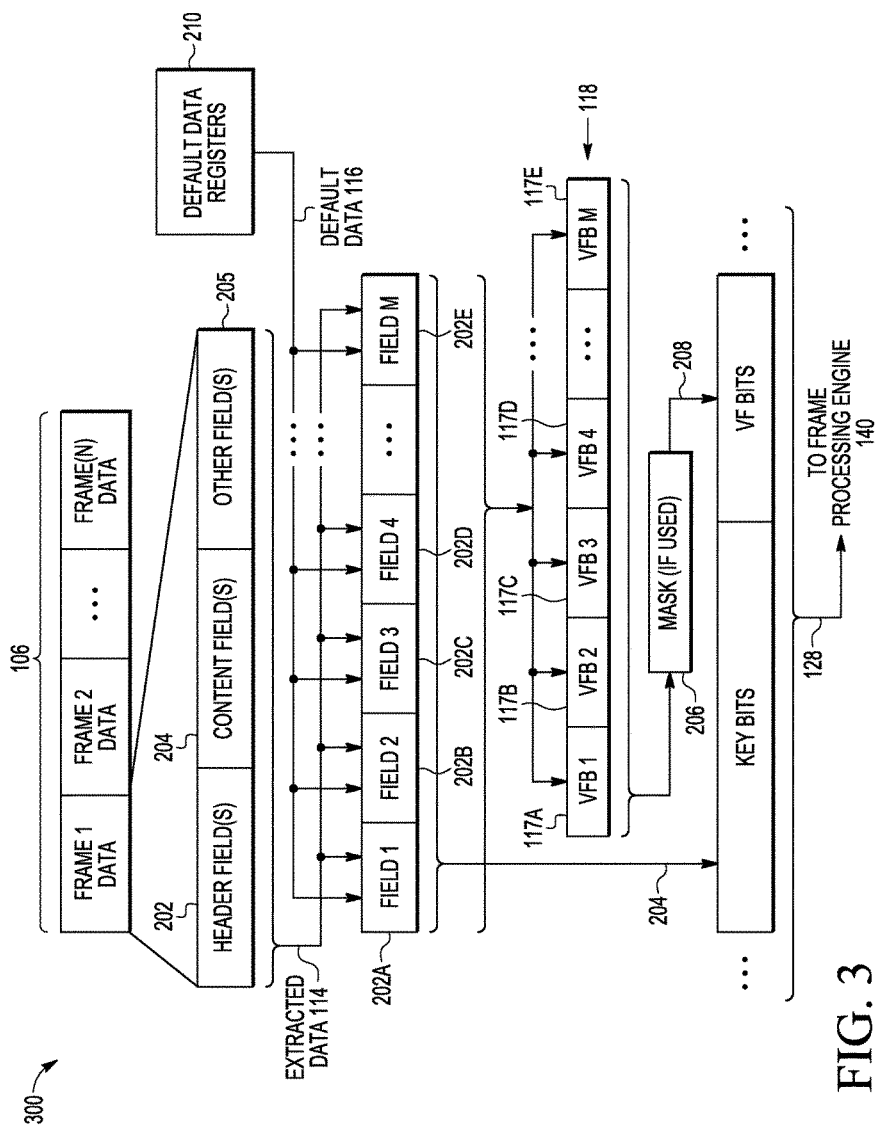
FIG. 3 is a block diagram of an example embodiment for generation of a frame classification key that includes embedded valid-field (VF) bits with and without application of a mask.

FIG. 3 is a block diagram of an example embodiment 300 for generation of a frame classification key 128 that includes embedded VF bits 118. Further, where a mask 206 has been defined for use, the mask 206 is applied to the VF bits 118 to determine which bits 208 are cleared before being embedded within the frame classification key 128. The frame data (FRAME1 DATA, FRAME2 DATA, . . . FRAME(N) DATA) 106 for N received packet frames each includes multiple data fields as represented by the contents of the first frame data, FRAME1 DATA. For the example embodiment depicted, the fields of this first frame data, FRAME1 DATA, include one or more header fields 202, one or more content fields 204, and one or more other associated metadata fields 205. As described above, the disclosed embodiments identify fields from which to extract data for classification key generation based upon FECs 124 that include one or more VF-FECs 126 where VF bits 118 are to be embedded within the frame classification key 128. For the embodiment 200 depicted, these identified fields are in part represented by M fields (FIELD1, FIELD2, FIELD3, FIELD4 . . . FIELD(M)) 202A, 202B, 202C, 202D . . . 202E.

With respect to key generation, for each field 202A, 202B, 202C, 202D . . . 202E that exists within the frame data, extracted data 114 is provided for that field. However, for each field 202A, 202B, 202C, 202D . . . 202E that does not exist within the frame data, default data 116 may instead be provided for that field. The resulting combination of extracted data 114 and default data 116 for the fields 202A, 202B, 202C, 202D . . . 202E is then stored as the key bits 204 within the frame classification key 128. It is noted that where all of the fields exist in the frame data, then the key bits 204 can be made up entirely of extracted data 114 without using any default data 116. It is also noted that the default data 116 to be used for any particular missing field can be pre-determined data values and can be stored, for example, in default data registers 210. It is further noted that two or more of the fields (FIELD1, FIELD2, FIELD3, FIELD4 . . . FIELD(M)) 202A, 202B, 202C, 202D . . . 202E can be based upon a common field with a particular received packet as defined within the FECs 124.

With respect to data extraction from identified fields, VF bits 118 are generated such that a valid bit 117 is associated with each identified field (FIELD1, FIELD2, FIELD3, FIELD4 . . . FIELD(M)) 202A, 202B, 202C, 202D . . . 202E. For the example embodiment 200 depicted, a first valid field bit (VFB1) 117A is associated with the first field (FIELD1) 202A. A second valid field bit (VFB2) 117B is associated with the second field (FIELD2) 202B. A third valid field bit (VFB3) 117C is associated with the third field (FIELD3) 202C. A fourth valid field bit (VFB42) 117D is associated with the fourth field (FIELD4) 202D. This continues for each of the identified fields with an Mth valid field bit (VFBM) 117E being associated with the Mth field (FIELD(M)) 202E. As one example, the number of VF bits 118 that are stored at any time can be limited to eight (8) bits for the eight (8) most recent identified fields, if desired, although other numbers of bits could also be used. If a mask 206 has been defined for use within the VF-FEC 126, this mask 206 determines which of the VF bits 118 are cleared before being used to provide the bits 208 that are embedded within the frame classification key 128. If no mask 206 is defined, then the VF bits 118 are provided directly as the resulting bits 208 that are embedded into the frame classification key 128. All of the VF bits 118 are then cleared after being embedded into the frame classification key 128, and each new valid bit 117 is used to update/change the cleared VF bits 118 until a new VF-FEC 126 is received. After VF bits 118 are embedded within the frame classification key 128 and the key composition rule 130 has completed, the resulting frame classification key 128 is provided to the frame processing engine 140 as described above. If no VF-FEC 126 is included within a key composition rule 130, then only the key bits 204 are included within the frame classification key 128 that is provided to the frame processing engine 140.

As one example for the use of a mask 206 with respect to the TABLE below, it is assumed that a VF-FEC 126 has been received, that only eight (8) bits are included within VF bits 118, and that a mask 206 has been defined such that four (4) of the VF bits 118 are cleared before the VF bits 118 are embedded into the frame classification key 128. The following TABLE provides example VF bits 118, an example mask 206, and example resulting bits 208 that are embedded within the frame classification key 128. For this example, it is assumed that a logic one for the VF bits 118 or the resulting VF bits 208 indicates that the field exists and/or that a logic validation check, such as a logic condition or function applied to the frame data 106, has been performed such that extracted data 114 is used for that field. It is also assumed that a logic zero for the VF bits 118 or the resulting VF bits 208 indicates that the field does not exist and/or is not qualified by the logic validation check such that default data 116 is used for that field. Further, it is assumed that a mask 206 is applied such that a mask bit of a logic zero clears the corresponding bit within VF bits 118 of the resulting VF bits 208 and that a mask bit of a logic one passes the logic value for the corresponding bit within VF bits 118 to the resulting VF bits 208. It is noted that logic state representations for the mask 206 could be switched, if desired. It is also noted that other mask techniques could also be used while still taking advantage of the VF bit embedding techniques described herein.

TABLE

EXAMPLE MASK FOR VF BITS 118

| | |
|---|---|
| VF Bits 118 | 1101-0011 |
| Mask 206 | 1000-1111 |
| Resulting VF Bits 208 | 1000-0011 |

Figure 4:
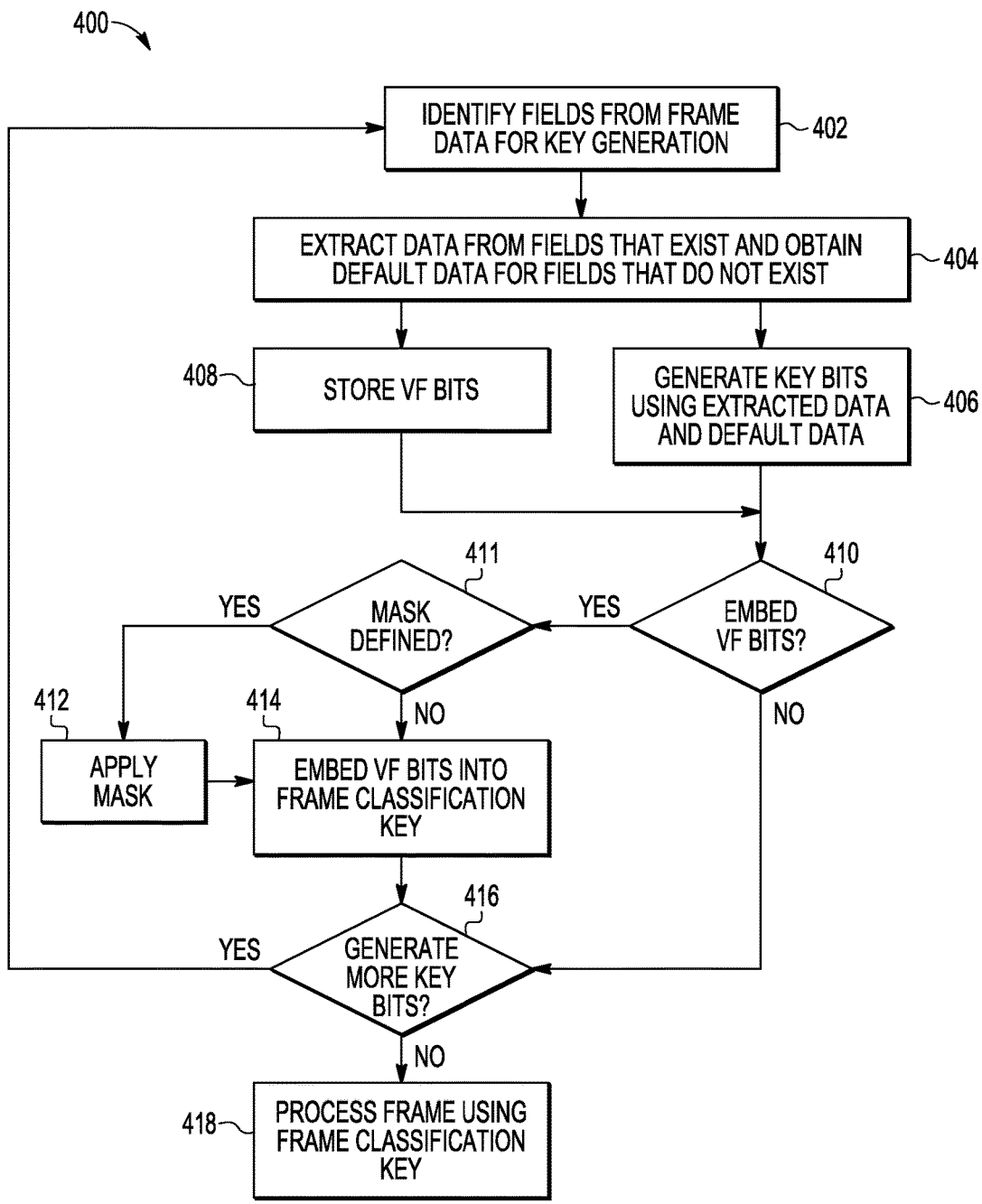
FIG. 4 is a process flow diagram of an example embodiment for generation of a frame classification key based upon field extraction commands (FECs) including a valid-field field extraction command (VF-FEC).

FIG. 4 is a process flow diagram of an example embodiment 400 for generation of a frame classification key 128 based upon FECs 124 including any VF-FECs 126. In block 402, one or more FECs 124 are used to identify fields from the frame data 106 that will be used for key generation. In block 404, data is extracted from fields that exist with the frame data 106 to provide extracted data 114, and default data 116 is obtained for the fields that do not exist in the frame data 106. In block 408, VF bits 118 are generated and stored for the identified fields (e.g., up to 8 bits for the last 8 fields extracted). In block 406, key bits are generated for a frame classification key 128 using the extracted data 114 and the default data 116. In block 410, a determination is made whether or not to embed the VF bits 118 into the frame classification key 128, for example, based upon receipt of a VF-FEC 126. If "NO," then flow passes to block 416. If "YES," then flow passes to block 411 where a determination is made whether a mask 206 was defined for the VF-FEC 126. If "YES," then the mask is applied in block 412 prior to block 414. If "NO," then block 414 is reached directly. In block 414, the VF bits 118, or a masked version of the VF bits 118 if a mask 206 has been applied in block 412, are embedded within the frame classification key 128. Flow then passes to block 416. In block 416, a determination is made whether additional key bits are to be generated, for example, based upon additional FECs 124. If "YES," then flow passes back to block 402. If "NO," then flow passes to block 418 where the frame is processed using the frame classification key 128, which will include VF bits 118 if at least one VF-FEC 126 was defined within the key composition rule 130 being used to generate the frame classification key 128. It is noted that the embodiment 400 could be modified such that blocks 408, 410, 411, 412, and 414 would only be performed if a VF-FEC 126 was included within the key composition rule 130 such that VF bits 118 were to be inserted into the frame classification key 128. As such, VF bits 118 would only be generated and stored if a VF-FEC 126 were included. It is further noted that different and/or additional processing blocks could also be implemented, as desired, while still taking advantage of embedded VF bits as described herein.

As described herein, a variety of embodiments can be implemented and different features and variations can be implemented, as desired.

For one embodiment, a method to process a network frame is disclosed including identifying fields for classification key generation where the fields being associated with packet frames for network communications, extracting data from each identified field that exists within frame data for a received packet frame, obtaining default data for each identified field that does not exist within the frame data, generating a frame classification key based upon the extracted data and the default data, and embedding valid-field (VF) bits within the frame classification key to distinguish the extracted data from the default data.

In additional embodiments, the method includes generating a valid bit for each identified field and storing a plurality of valid bits as the VF bits. In further embodiments, each valid bit has at least one of a first logic state or a second logic state where the first logic state represents an identified field that did exist within the frame data and from which data was extracted and where the second logic state represents an identified field that did not exist with the frame data and for which default data was obtained. In still further embodiments, the method also includes generating one or more bits for the VF bits based upon a logic condition applied to the frame data.

In further embodiments, the method includes processing the frame data at least in part based upon the VF bits embedded within the frame classification key. In other embodiments, the method includes using one or more field extraction commands (FECs) defined with a key composition rule to identify the fields for classification key generation.

In still further embodiments, the method includes using a valid-field field extraction command (VF-FEC) defined within a key composition rule to cause the embedding of the VF bits. In addition, the method can also include applying a mask to clear one or more of the VF bits prior to embedding the VF bits. Further, the method can include using the VF-FEC to define the mask. Still further, the method can include allowing the VF-FEC to be defined by a user through the key composition rule.

For another embodiment, a system to process a network frame is disclosed including a data storage system configured to store at least one key composition rule, a rule decoder configured to decode the at least one key composition rule to identify fields for classification key generation, a data extractor configured to extract data from identified fields that exist within frame data for a received packet frame and to provide default data for identified fields that do not exist within the frame data, and a key generator configured to generate a frame classification key based upon the extracted data and the default data and to embed VF bits within the frame classification key to distinguish the extracted data from the default data.

In additional embodiments, the data extractor is further configured to generate a valid bit for each of the identified fields, and wherein the VF bits comprise a plurality the valid bits. In further embodiments, each valid bit is configured to have at least one of a first logic state or a second logic state where the first logic state is configured to represent an identified field that does exist within the frame data and where the second logic state is configured to represent an identified field that does not exist with the frame data. In still further embodiments, the data extractor is further configured to generate one or more bits for the VF bits based upon a logic condition applied to the frame data.

In further embodiments, the system also includes a frame processing engine configured to process the frame data at least in part based upon the VF bits within the frame classification key. In other embodiments, the data extractor is configured to use one or more field extraction commands (FECs) decoded by the rule decoder from the at least one key composition rule to identify the fields for classification key generation.

In still further embodiments, the key generator is configured to embed the VF bits within the frame classification key based upon at least one valid-field field extraction command (VF-FEC) decoded by the rule decoder from the at least one key composition rule. In addition, the key generator can be further configured to apply a mask to the VF bits to clear one or more of the VF bits to be embedded within the frame classification key. Further, the key generator can also be configured to apply the mask based upon a mask definition within the VF-FEC. Still further, the VF-FEC can be user programmable through the at least one key composition rule.

It is further noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method to process a network frame, comprising:
    receiving network packets for network communications through a network interface;
    parsing packet frames for the network packets to obtain frame data including packet fields associated with the network packets;
    identifying fields for classification key generation that exist within the frame data and that do not exist within the frame data;
    extracting data from each identified field that exists within frame data for each packet frame;
    obtaining default data for each identified field that does not exist within the frame data for each packet frame;
    generating a frame classification key based upon the extracted data and the default data for each packet frame;
    embedding valid-field (VF) bits within the frame classification key for each packet frame to distinguish the extracted data from the default data;
    classifying the packet frames with classifications based upon the frame classification keys and the VF bits embedded within the frame classification keys, the VF bits identifying default data to ignore for the classifications; and
    processing the frame data for the packet frames based upon the classifications.

2. The method of claim 1, further comprising generating a valid bit for each identified field and storing a plurality of valid bits as the VF bits.

3. The method of claim 2, wherein each valid bit has at least one of a first logic state or a second logic state, wherein the first logic state represents an identified field that did exist within the frame data and from which data was extracted, and wherein the second logic state represents an identified field that did not exist with the frame data and for which default data was obtained.

4. The method of claim 1, further comprising generating one or more bits for the VF bits based upon a logic condition applied to the frame data.

5. The method of claim 1, wherein the classification for each packet frame indicates that the packet frame represents at least one of a data frame, an audio/video frame, a high priority frame, or a low priority frame.

6. The method of claim 1, further comprising using one or more field extraction commands (FECs) defined with a key composition rule to identify the fields for classification key generation.

7. The method of claim 1, further comprising using a valid-field field extraction command (VF-FEC) defined within a key composition rule to cause the embedding of the VF bits.

8. The method of claim 7, further comprising applying a mask to clear one or more of the VF bits prior to embedding the VF bits.

9. The method of claim 8, further comprising using the VF-FEC to define the mask.

10. The method of claim 7, further comprising allowing the VF-FEC to be defined by a user through the key composition rule.

11. A system to process a network frame, comprising:
 a data storage system configured to store at least one key composition rule;
 one or more processing devices configured to execute instructions stored in a non-transitory computer-readable medium to:
  parse packet frames for network packets received through a network interface to obtain frame data including packet fields associated with the network packets;
  decode the at least one key composition rule to identify fields for classification key generation;
  extract data from identified fields that exist within frame data for each packet frame;
  obtain default data for identified fields that do not exist within the frame data for each packet frame;
  generate a frame classification key for each packet frame based upon the extracted data and the default data
  embed VF bits within the frame classification key for each packet frame to distinguish the extracted data from the default data;
  classify the packet frames with classifications based upon the frame classification keys and the VF bits embedded within the frame classification keys, the VF bits identifying default data to ignore for the classifications; and
  process the frame data for the packet frames based upon the classifications.

12. The system of claim 11, wherein the one or more processing devices are further programmed to generate a valid bit for each of the identified fields, and wherein the VF bits comprise a plurality the valid bits.

13. The system of claim 12, wherein each valid bit is configured to have at least one of a first logic state or a second logic state, wherein the first logic state is configured to represent an identified field that does exist within the frame data, and wherein the second logic state is configured to represent an identified field that does not exist with the frame data.

14. The system of claim 11, wherein the one or more processing devices are further programmed to generate one or more bits for the VF bits based upon a logic condition applied to the frame data.

15. The system of claim 11, wherein the classification for each packet frame indicates that the packet frame represents at least one of a data frame, an audio/video frame, a high priority frame, or a low priority frame.

16. The system of claim 11, wherein the one or more processing devices are further programmed to use one or more field extraction commands (FECs) decoded from the at least one key composition rule to identify the fields for classification key generation.

17. The system of claim 11, wherein the one or more processing devices are further programmed to embed the VF bits within the frame classification key based upon at least one valid-field field extraction command (VF-FEC) decoded from the at least one key composition rule.

18. The system of claim 17, wherein the one or more processing devices are further programmed to apply a mask to the VF bits to clear one or more of the VF bits to be embedded within the frame classification key.

19. The system of claim 18, wherein the one or more processing devices are further programmed to apply the mask based upon a mask definition within the VF-FEC.

20. The system of claim 17, wherein the VF-FEC is user programmable through the at least one key composition rule.

\* \* \* \* \*